(12) United States Patent
Choi (10) Patent No.: US 9,826,174 B2
(45) Date of Patent: Nov. 21, 2017

(54) IMAGE PROCESSING APPARATUS AND METHOD

(71) Applicant: Samsung Electronics Co., Ltd., Gyeonggi-do (KR)

(72) Inventor: Woo-Seok Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 48 days.

(21) Appl. No.: 14/163,662

(22) Filed: Jan. 24, 2014

(65) Prior Publication Data

US 2014/0293080 A1 Oct. 2, 2014

(30) Foreign Application Priority Data

Mar. 26, 2013 (KR) .................. 10-2013-0032020
Jun. 7, 2013 (KR) .................. 10-2013-0065173

(51) Int. Cl.
| | |
|---|---|
| *H04N 5/347* | (2011.01) |
| *H04N 5/345* | (2011.01) |
| *H04N 5/369* | (2011.01) |
| *H04N 5/367* | (2011.01) |
| *H04N 9/04* | (2006.01) |

(52) U.S. Cl.
CPC .......... *H04N 5/347* (2013.01); *H04N 5/3452* (2013.01); *H04N 5/3456* (2013.01); *H04N 5/3696* (2013.01); *H04N 5/367* (2013.01); *H04N 9/045* (2013.01)

(58) Field of Classification Search
CPC .... H04N 5/347; H04N 5/3452; H04N 5/3456; H04N 5/3696
See application file for complete search history.

(56) References Cited

U.S. PATENT DOCUMENTS

| | | | |
|---|---|---|---|
| 2007/0237512 A1 | 10/2007 | Kusaka | |
| 2011/0096189 A1 | 4/2011 | Taniguchi | |
| 2011/0267511 A1 | 11/2011 | Imafuji | |
| 2013/0107067 A1* | 5/2013 | Miyakoshi | ................. 348/208.5 |
| 2013/0201383 A1* | 8/2013 | Okado | ..................... G02B 7/34 348/345 |
| 2013/0229555 A1* | 9/2013 | Hashimoto | .......... H04N 5/3696 348/300 |

(Continued)

FOREIGN PATENT DOCUMENTS

| | | |
|---|---|---|
| JP | 2007-282109 | 10/2007 |
| JP | 2010020055 | 1/2010 |

*Primary Examiner* — Daniel M Pasiewicz
(74) *Attorney, Agent, or Firm* — The Farrell Law Firm, P.C.

(57) ABSTRACT

An image processing apparatus and method are provided. In the method, an image sensor including first pixels for detecting an image and second pixels for detecting a different type of signals, reads out values from at least one of the second pixels and at least one the first pixels, based on a predetermined rule, outputs a first sampling image, based on the read out pixels, restores values of the at least one of the second pixels to be image pixel values for locations of the at least one of the second pixels included in the first sampling image, outputs a restored image based on the restored values, performs binning on pixels of the restored image using a predetermined method; and outputs a reduced resolution image with a resolution reduced at a predetermined rate from the restored image, based on the binning.

12 Claims, 10 Drawing Sheets

(56) References Cited

U.S. PATENT DOCUMENTS

| | | | |
|---|---|---|---|
| 2013/0258155 A1* | 10/2013 | Ueda | H04N 5/21 |
| | | | 348/308 |
| 2013/0265295 A1* | 10/2013 | Ogawa | 345/214 |
| 2013/0293736 A1* | 11/2013 | Kuwazoe | H04N 5/3696 |
| | | | 348/222.1 |
| 2014/0049668 A1* | 2/2014 | Endo et al. | 348/272 |
| 2015/0062102 A1* | 3/2015 | Ikeda | H04N 5/347 |
| | | | 345/207 |
| 2015/0062374 A1* | 3/2015 | Okazawa | G02B 7/34 |
| | | | 348/229.1 |
| 2015/0109498 A1* | 4/2015 | Aoki et al. | 348/280 |
| 2015/0117832 A1* | 4/2015 | Aoki et al. | 386/224 |
| 2015/0319412 A1* | 11/2015 | Koshiba | H04N 5/367 |
| | | | 348/246 |

\* cited by examiner

IMAGE PROCESSING APPARATUS AND METHOD

PRIORITY

This application claims priority under 35 U.S.C. §119(a) to Korean Patent Application Serial Nos. 10-2013-0032020 and 10-2013-0065173, which were filed in the Korean Intellectual Property Office on Mar. 26, 2013 and Jun. 7, 2013, respectively, the entire disclosure of each of which is incorporated herein by reference.

BACKGROUND OF INVENTION

1. Field of Invention

The present invention relates generally to an image processing apparatus and method.

2. Description of Related Art

Typically, digital image capturing devices, such as cameras, are equipped with image sensors to process an image of an object.

In the digital image capturing device, light reflected off of an object passes through a lens to the image sensor at which the light forms an image. The image sensor converts the image to digital image data for output by changing light intensities to intensities of electrical signals.

The image sensor includes a plurality of image pixels and an output circuit. Each of the plurality of image pixels generates an electrical signal corresponding to an intensity of light occurring on the image pixel, and the output circuit outputs the electrical signals of the image pixels. An image processor receives the electrical signals of the image pixels and outputs a captured image by performing suitable digital image processing on the electrical signals.

Image sensors that quickly adjust focus have been commercialized by replacing some of the image pixels with focus detection pixels for generating signals for focus adjustment rather than for image detection. Basically, a plurality of image pixels are used to output image signals while focus detection pixels are used to output signals, e.g., phase difference signals, for adjusting image focus. The focus detection pixels are different in structure than the image pixels for obtaining image signals, and are generally not available for outputting image signals.

SUMMARY

An aspect of the present invention is to provide an image processing apparatus and method for an image sensor including pixels that are not normally used to output an image signal, such as focus detection pixels, to read signals from both image pixels and the focus detection pixels, without image quality loss, in a low resolution mode for making video clips or providing live views.

Another aspect of the present invention is to provide an image processing apparatus and method for an image sensor including pixels not normally used to output an image signal, such as focus detection pixels, to output a reduced resolution image and then to obtain image data without image quality loss, by post-processing in a low resolution mode, e.g., for making video clips or providing live views.

Another aspect of the present invention is to provide an apparatus and method for focus adjustment with correct values of focus detection pixels, while decreasing image quality loss caused by the focus detection pixels, when pixel values are provided from a digital image sensor including one or more pixels that produce data not normally used as image information, such as focus detection pixels.

In accordance with an aspect of the present invention, an image processing apparatus is provided, which includes an image sensor including a plurality of first pixels configured to detect an image and a plurality of second pixels configured to detect a different type of signals than the plurality of first pixels, the image sensor being configured to read out values from at least one of the plurality of second pixels and at least one the plurality of first pixels, based on a predetermined rule, and to output a first sampling image, based on the read out values; and an image processor configured to restore values of the at least one of the plurality of second pixels to be image pixel values for locations of the at least one of the plurality of second pixels included in the first sampling image, to output a restored image based on the restored values, to perform binning on pixels of the restored image using a predetermined method, and to output a reduced resolution image with a resolution reduced at a predetermined rate from the restored image, based on the binning.

In accordance with another aspect of the present invention, an image processing method is provided for an image sensor that includes a plurality of first pixels for detecting an image and a plurality of second pixels for detecting a different type of signals than the plurality of first pixels. The image processing method includes reading out values from at least one of the plurality of second pixels and at least one the plurality of first pixels, based on a predetermined rule; outputting a first sampling image, based on the read out pixels; restoring values of the at least one of the plurality of second pixels to be image pixel values for locations of the at least one of the plurality of second pixels included in the first sampling image; outputting a restored image based on the restored values; performing binning on pixels of the restored image using a predetermined method; and outputting a reduced resolution image with a resolution reduced at a predetermined rate from the restored image, based on the binning.

BRIEF DESCRIPTION OF THE DRAWINGS

The above and other aspects, features, and advantages of certain embodiments of the present invention will become more apparent from the following detailed description, taken in conjunction with the attached drawings, in which.

DETAILED DESCRIPTION

Various embodiments of the present invention will be described more fully hereinafter with reference to the accompanying drawings. The present invention may, however, be embodied in many different forms and should not be construed as limited to the embodiments described herein; rather, these embodiments are provided so that this invention will be thorough and complete, and will fully convey the scope of the invention to those skilled in the art.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the invention. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
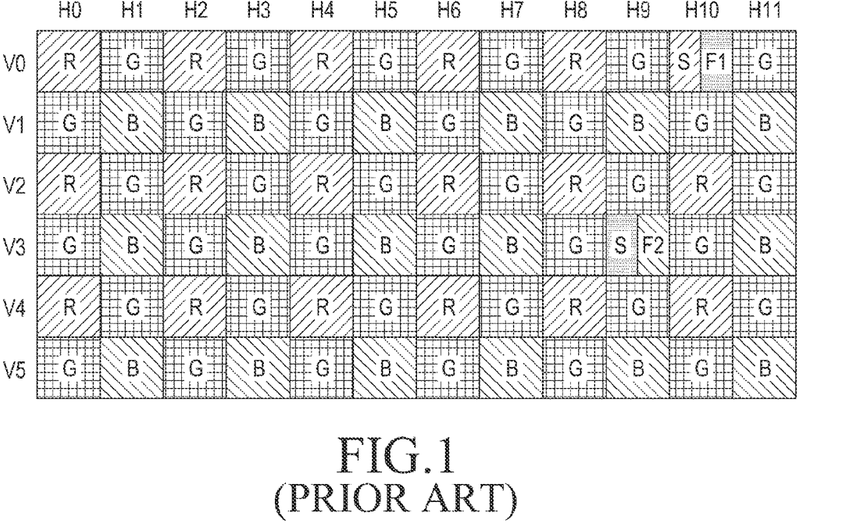
FIG. 1 illustrates pixels of an image sensor.

FIG. 1 illustrates pixels of an image sensor.

Referring to FIG. 1, R, G, and B represent image pixels, and F1 and F2 represent focus detection pixels. The image sensor may output an image by reading out respective signals from R, G, and B pixels, and may detect focus by reading out signals from F1 and F2 pixels.

The manner in which the image sensor reads out signals from the pixels may vary depending on operation mode of the digital image capturing device. For example, the operation mode of the digital image capturing device may be a high resolution capturing mode or a low resolution capturing mode. The digital image capturing device may take photos in the high resolution capturing mode, while capturing lower resolution images in the low resolution capturing mode, such as liveview mode or video mode. The digital image capturing device may read out signals from all of the pixels of the image sensor in the high resolution capturing mode, but in the low resolution capturing mode, read the signals after sampling.

In the latter case, to improve Signal to Noise Ratio (SNR) of an image, a binning operation may be performed to combine signals from two or more pixels during readout. Binning may be classified into analog binning, which outputs an average pixel signal through an analog circuit, and digital binning, which converts a plurality of digital pixel signals into a single pixel signal based on a predetermined operation.

In the former case where the image sensor reads out signals from all the pixels, high resolution images and signals from the focus detection pixels may be output. However, if the image sensor operates in sampling mode for reading out signals from a subset of pixels, some or all of the focus detection pixels may not be read. In this case, focus adjustment is impossible because signals from the focus detection pixels may not have been read. Therefore, a need exists for a sampling method for reading every focus detection pixel without omission while reading a subset of all pixels.

Figure 2A:
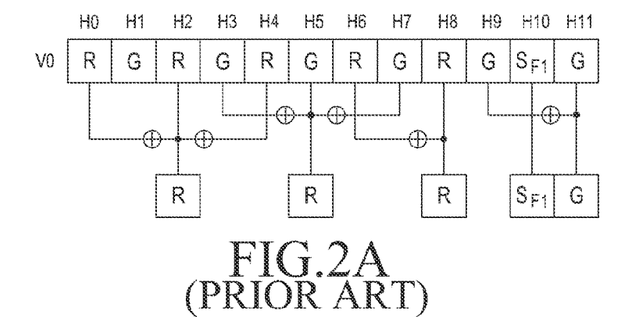
FIGS. 2A and 2B illustrates examples of an image sensor sampling and reading signals from pixels thereof.
Figure 2B:
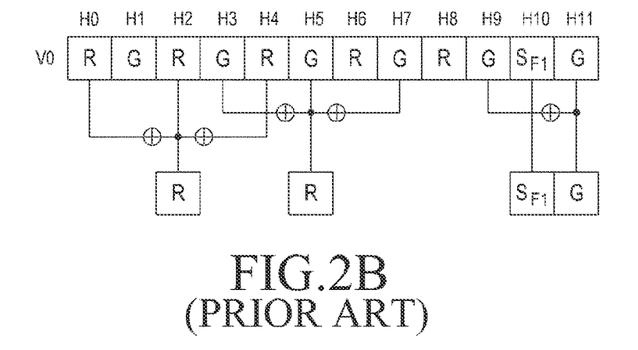

FIGS. 2A and 2B illustrate how an image sensor samples and reads signals from a subset of all pixels.

Referring to FIGS. 2A and 2B, the image sensor may perform binning on a plurality of image pixels to read as a single pixel signal, while reading signals from focus detection pixels without binning.

Referring to FIG. 2A, if there is a focus detection pixel located in a target pixel position for binning, the image sensor may output signals from image pixels other than the focus detection pixel by binning them, while outputting a signal from the focus detection pixel as it is read, i.e. intact. For example, an R pixel signal is output by binning three image pixels, i.e., an R pixel in row V0 and column H0, an R pixel in row V0 and column H2, and an R pixel in row V0 and column H4. Typically, the image sensor may employ analog binning with a readout circuit. If three pixels correspond to focus detection pixels, e.g., F1 pixels, two of these pixels may be used to produce a single pixel signal through binning and the remaining F1 pixel may be read separately for output. The signal from the remaining F1 pixel is not used for image creation.

Referring to FIG. 2B, if there is a focus detection pixel located in a target pixel position for binning, the image sensor may read a signal from the focus detection pixel for output while not reading the remaining image pixels, so that the remaining image pixels are restored later using a Defect Pixel Correction (DPC) algorithm. For example, if there are three image pixels, the image sensor may produce a single pixel signal by binning the three image pixels. However, if there are two image pixels and a single focus detection pixel F1, the image sensor may refrain from reading the two image pixels so that they may be restored later using the DPC algorithm, but still reads out a signal from the focus detection pixel F1.

In FIG. 2A, where there is a focus detection pixel located in a target pixel position for binning and the image sensor performs binning only on the image pixels, not the focus detection pixel, an image signal may not be detected from the focus detection pixel. Consequently, whether an image signal at the location of the focus detection pixel is reflected after binning makes a huge difference, possibly causing image quality problems.

For example, assuming signals of three pixels are binned into a single pixel signal, if two image signals each have a value of '0' and an image signal at a location of a focus detection pixel has a value of '100', normal binning of the three pixels would make a value of '33'. However, because the third pixel is the focus detection pixel, only the two pixels having a value of '0' are binned to '0', significantly affecting the image quality, and causing a significant difference in pixel value compared to neighboring pixels. This may degrade image quality.

As illustrated in FIG. 2B, where there is a focus detection pixel located in a target pixel position for binning, only a signal from the focus detection pixel may be read out, while signals from the remaining image pixels remain unread for being restored later using the DPC algorithm, which may cause an error in the restored image due to limitations in the DPC algorithm and thus degrade image quality further.

For example, binning may result in a low resolution image, whereas applying the DPC algorithm that estimates defective pixels based on variation from a low resolution image to a neighboring image, edge direction, or the like, may further degrade the image quality compared with applying the DPC algorithm to a high resolution image because when applying the DPC algorithm to the low resolution image, defective pixel correction performance is lower than that for the high resolution image. In addition, because only a signal from the focus detection pixel may be read out, there are as many defective pixels occurring as the number of focus detection pixels, which increases the number of pixels handled as defective pixels and decreases quality.

For example, if there are two focus detection pixels among a 12×12 pixel array, a ratio of pixels to be treated as defective pixels for correction is 2/(12*12)=1.39%. However, when using a process of binning three pixels for this image, two pixels among 4×4 pixels may be treated as defective pixels and thus 12.5% of total pixels (two pixels among 4×4 pixels) may be treated as defective pixels for restoration, thus leading to a further loss of quality.

Figure 3:
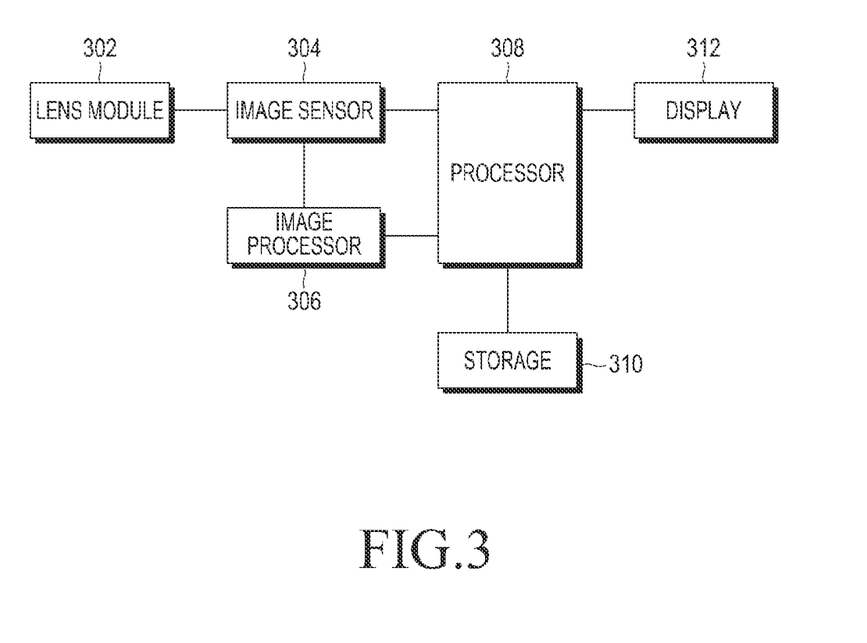
FIG. 3 is a block diagram illustrating an image processing apparatus, according to an embodiment of the present invention.

FIG. 3 is a block diagram illustrating an image processing apparatus, according to an embodiment of the present invention.

Referring to FIG. 3, the image processing apparatus includes a lens module 302, an image sensor 304, an image processor 306, a controller 308, a storage 310, and a display 312.

The lens module 302 may include a plurality of lenses through which light reflected off of an object is passed.

The image sensor 304 may include a plurality of image pixels and a plurality of focus detection pixels. Once the light, which has passed through the lens module 302, reaches the plurality of image pixels and the plurality of focus detection pixels, forming an image thereon, the image sensor 304 may change the image into intensities of electrical signals and read out pixel values of the image and values of focus detection pixels using the intensities of electrical signals from those pixels. The image sensor 304 reads out signals from a subset of the pixels, which are sampled based on a predetermined rule, in low resolution mode, such as liveview mode or video mode for capturing low resolution images. For example, the image sensor 304 may output a first sampling image by reading values of some pixels including focus detection pixels, from among all the pixel values of the image formed on the image sensor 304, e.g., using a 2Read2Skip sampling method or a 1Read2Skip sampling method.

The image processor 306 processes the image using the pixel values of the first sampling image output from the image sensor 304. For example, the image processor 306 may apply the DPC algorithm for the focus detection pixels included in the first sampling image to restore the values of the focus detection pixels to be values of corrected image pixels, produce a restored image such that pixel values at the locations of the focus detection pixels may be values of the corrected image pixels, and output a final image by binning pixels of the restored image based on a predetermined rule so that the restored image may be reduced by having its resolution reduced at a predetermined rate (e.g., 1/2). The focus detection pixel values may be provided directly to a focus adjustment module (not illustrated) to adjust focus of the lens module 302, or may be stored in the storage 310 for the focus adjustment module to adjust focus of the lens module 302. For example, a phase-difference focus adjustment method may be used.

The controller 308 controls general operations of the image processing apparatus, including controlling the image sensor 304 to read out values from a subset of the pixels that are sampled based on a predetermined rule.

Further, the controller 308 may perform post-processing using pixel values included in the final image output from the image processor 306 in low resolution mode, and control the display 312 to display the post-processed image or store the post-processed image in the storage 310.

The storage 310 stores image pixel values and focus detection pixel values read by the image sensor 304.

The display 312 displays images under control of the controller 308.

Figure 4:
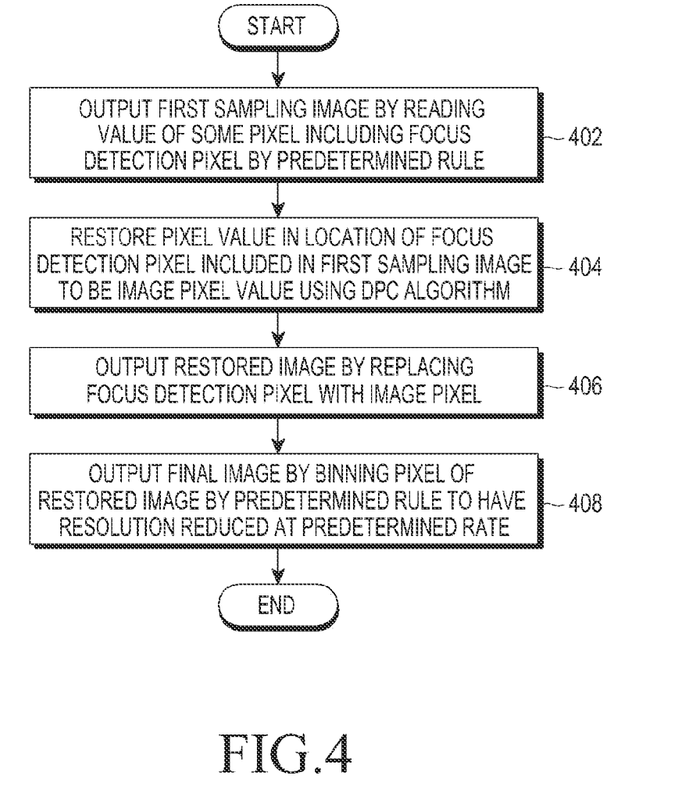
FIG. 4 is a flowchart illustrating operations of an image processing apparatus, according to an embodiment of the present invention.

FIG. 4 is a flowchart illustrating operations of an image processing apparatus, according to an embodiment of the present invention.

Referring to FIG. 4, in step 402, an image processing apparatus, e.g., using the image sensor 304 as illustrated in FIG. 3, outputs a first sampling image by reading values of some pixels including focus detection pixels, from among all the pixel values of the image formed on the image sensor 304, based on a predetermined rule. For example, the predetermined rule may be a 2Read2skip sampling method, a 1Read2Skip sampling method, or any other suitable sampling method. Additionally, a non-sampling rule may be used.

In step 404, the image processing apparatus restores image signals at the locations of the focus detection pixels to be values of corrected image pixels, e.g., applies a DPC algorithm for the pixel values at locations of the focus detection pixels included in the first sampling image.

In step 406, the image processing apparatus outputs a restored image by replacing the pixel values at the locations of the focus detection pixels with the corrected image pixel values.

In step 408, the image processing apparatus outputs a final image by binning pixels of the restored image based on a predetermined rule, such that the restored image has its resolution reduced at a predetermined rate (e.g., 1/2). Digital binning may be used to convert a plurality of pixels signals into a single pixel signal using a predetermined operation. For example, the predetermined operation may include any of averaging, weighted averaging, summing operations, etc.

Figure 5A:
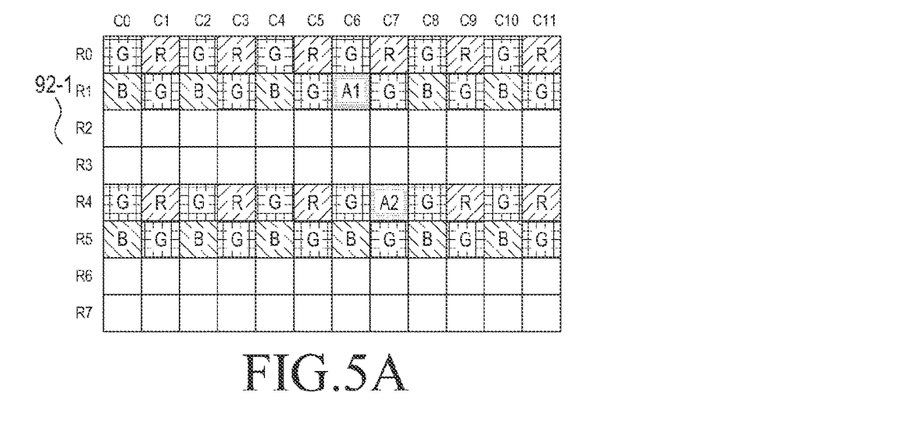
FIGS. 5A to 5D illustrate an image processing operation, according to an embodiment of the present invention.

FIGS. 5A to 5D illustrate an image processing operation, according to an embodiment of the present invention. Specifically, FIG. 5A illustrates pixels of an image sensor, such as the image sensor 304, including image pixels R, G, and B and focus detection pixels A1 and A2.

Figure 5B:
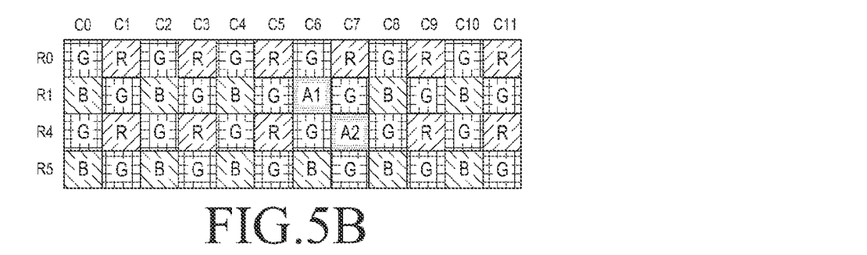

Referring to FIG. 5A, for all the pixels illustrated therein, the image sensor 304 may output a first sampling image, as illustrated in FIG. 5B, by reading out values of pixels in all columns C0-C11 in a horizontal direction, reading out values of pixels in a vertical direction by reading pixels in two rows R0 and R1, skipping the next two rows R2 and R3, reading again pixels of the next two rows R4 and R5, etc., (i.e., using 2Read2Skip sampling method). In this case, it is desirable for the image sensor 304 not to skip, but to read a row that includes any focus detection pixel A1 or A2.

FIG. 5B illustrates a first sampling image output by the image sensor 304 performing first sampling on some of all the pixels. The first sampling image may have half the resolution of the entire image illustrated in FIG. 5A. Also, since the first sampling is performed only in the vertical direction, only the vertical resolution is reduced to half, while the horizontal resolution of the image remains the same as that of the entire image of FIG. 5A.

Once the first sampling image illustrated in FIG. 5B is output by the image sensor 304, the image processor 306 may detect values of the focus detection pixels A1 and A2 included in the first sampling image and store them in the storage 310 for focus adjustment or provide them to a separate focus adjustment module (not illustrated). Also, the image processor 306 may restore the values of the focus detection pixels A1 and A2 to be values of image pixels B' and R' using the DPC algorithm, and produce a restored image with the values of image pixels B' and R', as illustrated in FIG. 5C.

Figure 5C:
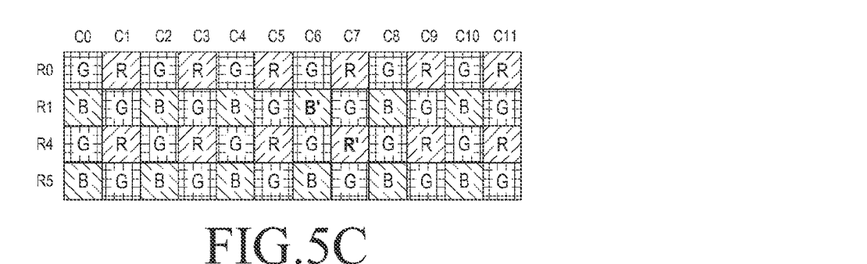
Figure 5D:
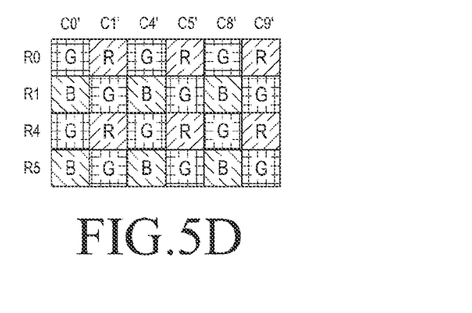

With the restored image with the values of image pixels B' and R', the image processor 306 may output a final image as illustrated in FIG. 5D by binning all of the pixels included in the horizontal rows of the restored image so that the restored image is reduced to have half the resolution. The binning technique may refer to digital binning which converts a plurality of pixel signals to a single pixel signal based on a predetermined operation.

In accordance with an embodiment of the present invention, values of two pixels are combined and then divided by 2 to produce a single pixel value. For example, the image processor 306 combines values of pixels in columns C0 and C2 in an image as illustrated in FIG. 5C, and divides the combined value by two to output single pixel values for column C0', as illustrated in FIG. 5D. Accordingly, the final image illustrated in FIG. 5D may have C0'=(C0+C2)/2. Similarly, the final image may also have C1'=(C1+C3)/2, C4'=(C4+C6)/2, C5'=(C5+C7)/2.

Alternatively, the image processor 306 may output a final image by applying an image resizing algorithm, instead of the binning technique, to reduce all the pixels included in the horizontal rows of the restored image illustrated in FIG. 5C to half.

In the image processing method illustrated in FIGS. 5A to 5D, image pixel signals are restored for use from locations where focus detection pixels are, and thus the final image quality may be better than in a scenario where the image pixel signals from the locations of the focus detection pixels are not used. Also, because the horizontal resolution remains the same as the resolution of an entire image, even if the vertical resolution is reduced to half the resolution of the entire image, applying the DPC algorithm thereto may be expected to bring out better correction results than applying the DPC algorithm to an image with both horizontal and vertical resolution reduced to half, because there is more data available for correction.

Further, even if an error occurs during the correction, the impact of the error may be reduced through the binning operation. For example, referring to FIG. 5C, although a value of pixel B' restored from data from a location of the pixel A1 through the DPC algorithm has an error of 'e', such as B'=B+e, the final image, as illustrated in FIG. 5D, may have C4'=(C4+C6)/2=B+e/2, and thus, have a reduced error of e/2.

Figure 6A:
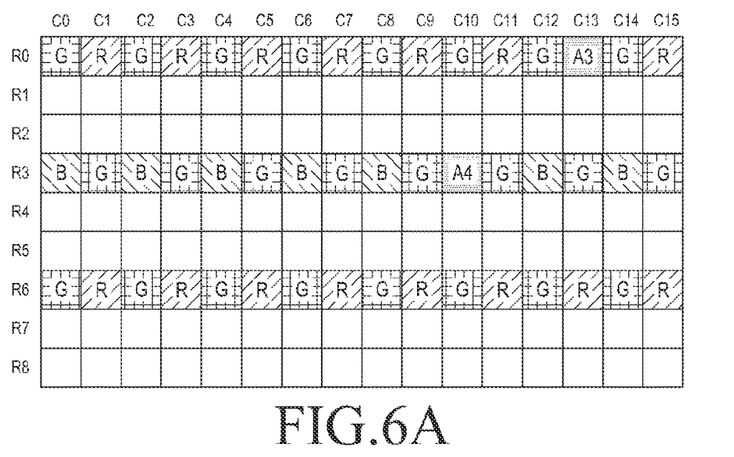
FIGS. 6A to 6D illustrate an image processing operation, according to an embodiment of the present invention.

FIGS. 6A to 6D illustrate an image processing operation, according to an embodiment of the present invention. Specifically, FIG. 6A illustrates pixels of an entire image sensor, such as the image sensor 304, including image pixels R, G, and B and focus detection pixels A3 and A4.

Figure 6B:
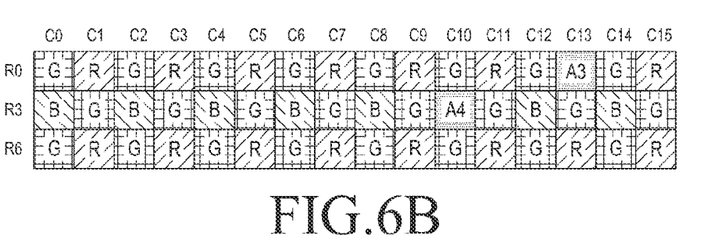

Referring to FIG. 6A, for all the pixels illustrated therein, the image sensor 304 may output a first sampling image, as illustrated in FIG. 6B, by reading out values of pixels in columns C0-C11 in a horizontal direction, reading out values of pixels in a vertical direction by reading pixels contained in the first row R0, skipping next two rows R1 and R2, reading again pixels of the fourth row R3, etc., (i.e., using 1Read2Skip sampling method). In this case, it is desirable for the image sensor 304 not to skip but to read a row that includes any focus detection pixel A3 or A4.

FIG. 6B illustrates a first sampling image output by the image sensor 304 performing first sampling on a subset of the pixels. The first sampling image may have a third (or ⅓) of the resolution of the entire image illustrated in FIG. 6A. Also, because the first sampling is performed only in the vertical direction, only the vertical resolution is reduced to a third while a horizontal resolution of the image remains the same as that of the entire image of FIG. 6A.

Once the first sampling image illustrated in FIG. 6B is output by the image sensor 304, the image processor 306 may detect values of the focus detection pixels A3 and A4 included in the first sampling image and store them in the storage 310 for focus adjustment or directly provide them to a separate focus adjustment module (not illustrated). The image processor 306 may then restore the values of the focus detection pixels A3 and A4 to be values of image pixels B' and R' using the DPC algorithm, and produce a restored image with the values of image pixels B' and R', as illustrated in FIG. 6C.

Figure 6C:
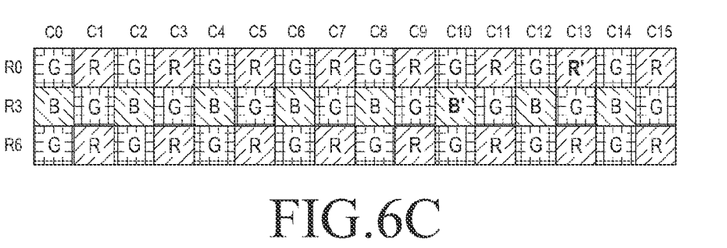
Figure 6D:
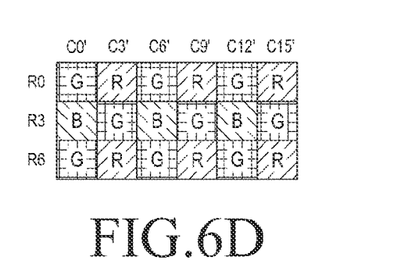

With the restored image with the values of image pixels B' and R', the image processor 306 may output a final image as illustrated in FIG. 6D by binning all of the pixels included in the horizontal rows of the restored image, such that the restored image may be reduced to have a third of the resolution of the restored image. The binning technique may refer to digital binning, which converts a plurality of pixel signals to a single pixel signal based on a predetermined operation. As illustrated in FIGS. 6A to 6D, values of three pixels are combined and then divided by 3 to produce a single pixel value. For example, the image processor 306 combines values of pixels in columns C0, C2, and C4 in an image as illustrated in FIG. 6C, and divides the combined value by three to output single pixel values for column C0', as illustrated in FIG. 6D. Accordingly, the final image of FIG. 6D may have C0'=(C0+C2+C4)/3, C3'=(C3+C5+C7)/3, C6'=(C6+C8+C10)/3, etc.

Alternatively, the final image may use a weighted averaging operation, such as C0'=(C0+2*C2+C4)/3, wherein the pixel in the middle is weighted by 2.

As yet another alternative, the image processor 306 may output a final image by applying an image resizing algorithm, instead of the binning algorithm, to reduce all the pixels included in the horizontal rows of the restored image of FIG. 6C by a third.

In FIGS. 6A to 6D, image pixel signals are restored for use from focus detection pixel values, and thus the final image quality may be better than in situations where the image pixel signals from the locations of the focus detection pixels are not used. Also, because horizontal resolution remains the same as the resolution of an entire image, even if vertical resolution is reduced to a third of the resolution of the entire image, applying the DPC algorithm thereto may be expected to bring out better correction results than applying the DPC algorithm to an image with both horizontal and vertical resolution reduced to a third because there is additional data available for correction. Further, even if an error occurs during the correction, the impact of the error may be reduced through the binning operation.

For example, referring to FIG. 6D, a value of a pixel in column C9' and row R0 is produced by (C9+C11+C13)/3 in the restored image of FIG. 6C, wherein the pixel in column C13 and row R0 has a value corrected using the DPC algorithm. In this case even if an error 'e' occurs during the correction, the final image, as illustrated in FIG. 6D, may have a reduced error, e/3.

Figure 7A:
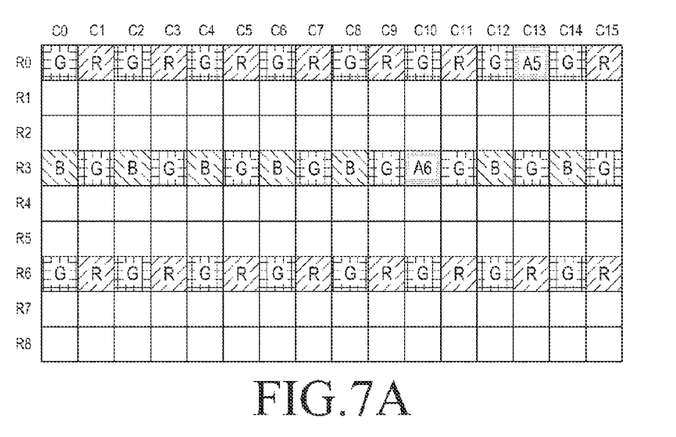
FIGS. 7A to 7F illustrate an image processing operation, according to an embodiment of the present invention.

FIGS. 7A to 7F illustrate an image processing operation, according to an embodiment of the present invention. Specifically, FIG. 7A illustrates pixels of an image sensor, such as the image sensor 304, including image pixels R, G, and B and focus detection pixels A5 and A6.

Figure 7B:
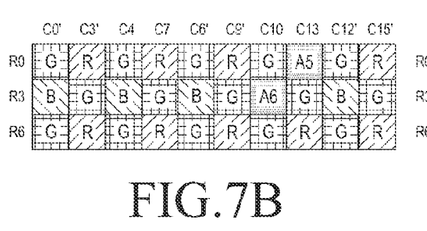

The image sensor 304 may output pixels, e.g., as many as a third of the pixels of the entire image, by performing first sampling on the pixels of the image illustrated in FIG. 7A in both horizontal and vertical directions. For example, the image sensor 304 may output a first sampling image, as illustrated in FIG. 7B, by performing first sampling in a manner of binning pixels in two of three columns, in one of three rows, into one pixel while outputting pixels of the remaining column, e.g., C4, intact for all of the pixels of the entire image illustrated in FIG. 7A. Specifically, the image sensor 304 may perform binning on values of pixels at R0C0 and R0C2 among pixels at R0C0, R0C2 and R0C4 into a single value for pixel at R0C0' as illustrated in FIG. 7B while outputting a value of the pixel at R0C4 intact as illustrated in FIG. 7B. Likewise, the image sensor 304 may perform binning on values of pixels at R0C3 and R0C5 among pixels at R0C3, R0C5 and R0C7 into a value for pixel at R0C3' as illustrated in FIG. 7B while outputting a value of the pixel at R0C7 intact as illustrated in FIG. 7B.

Figure 7C:
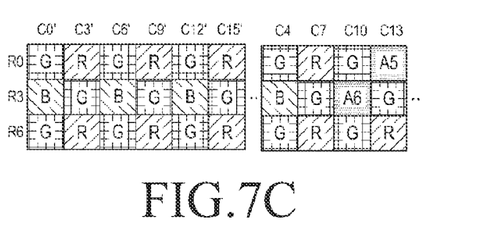

As such, the image sensor 304 may output the first sampling image as illustrated in FIG. 7B by performing first sampling on all the pixels of the entire image illustrated in FIG. 7A. The first sampling image may be separated out into pixels values obtained from binning and pixel values output intact, as illustrated in FIG. 7C. It is desirable for the first sampling image to have the focus detection pixels A5 and A6.

Figure 7D:
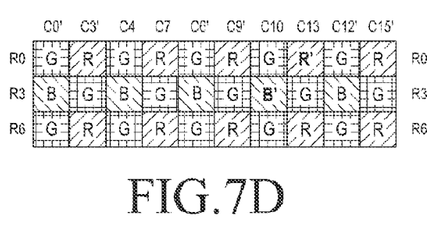
Figure 7E:
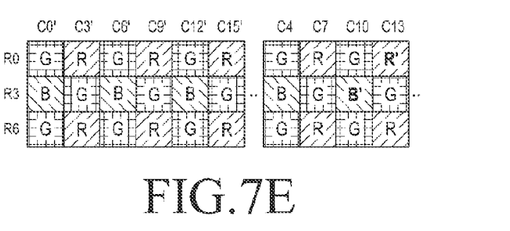

Once the first sampling image illustrated in FIG. 7B or 7C is output by the image sensor 304, the image processor 306 may detect values of the focus detection pixels A5 and A6 included in the first sampling image and store them in the storage 310 for focus adjustment or provide them to a separate focus adjustment module (not illustrated). The image processor 306 may restore the values of the focus detection pixels A5 and A6 to be values of image pixels R' and B' using the DPC algorithm, and produce a restored image with the values of image pixels R' and B', as illustrated in FIG. 7D or 7E.

Figure 7F:
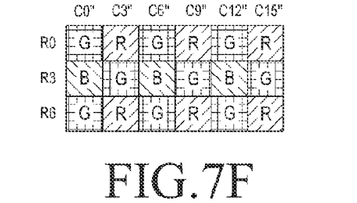

With the restored image with the values of image pixels R' and B', the image processor 306 may output a final image as illustrated in FIG. 7F by binning all of the pixels included in the horizontal rows of the restored image to have half the resolution of the restored image.

For example, the image processor 306 may perform binning on values of two pixels at R0C0' and R0C4 to output a value for pixel at R0C0", as illustrated in FIG. 7F. The binning may be performed with the following operation to obtain e.g., the value for the pixel at R0C0": pixel value at R0C0"=(2*(pixel value at R0C0')+C4)/3, wherein the pixel value at R0C0' has already been obtained by binning values of pixels at R0C0 and R0C2. Further, two pixels at R0C3' and R0C7 are binned into a value for pixel at R0C3" as illustrated in FIG. 7F. Values for pixels at R0C6", R0C9", R0C12" and R0C15" illustrated in FIG. 7F are obtained in the same way.

Figure 8A:
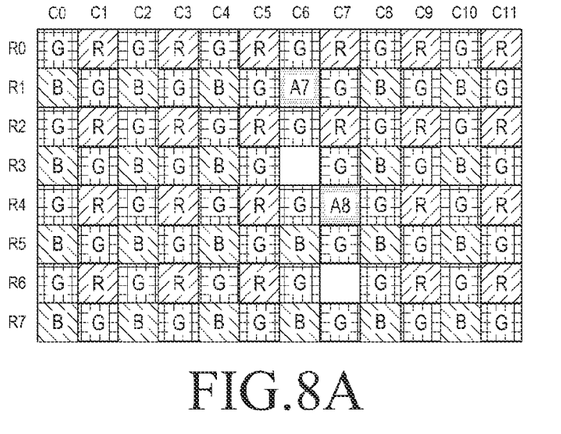
FIGS. 8A to 8D illustrate an image processing operation, according to an embodiment of the present invention.

FIGS. 8A to 8D illustrate an image processing operation, according to an embodiment of the present invention. Specifically, FIG. 8A illustrates pixels of an image sensor, such as the image sensor 304, including image pixels R, G, and B and focus detection pixels A7 and A8.

Figure 8B:
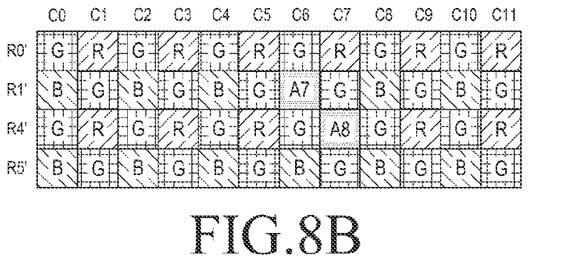

The image sensor 304 may output a first sampling image reduced by half in the vertical direction by performing first sampling on all the pixels of the entire image illustrated in FIG. 8A. For example, the image sensor 304 may output the first sampling image as illustrated in FIG. 8B by performing first sampling in the manner of binning values of pixels in two rows with respect to respective columns into single pixel values for all the pixels of the entire image illustrated in FIG. 8A. Specifically, the image sensor 304 may perform binning on values of pixels at R0C0 and R1C0 to output a value for the pixel at R0'C0, and on values of pixels at R1C0 and R3C0 to output a value for the pixel at R1'C0, as illustrated in FIG. 8B. As such, the image sensor 304 may output the first sampling image as illustrated in FIG. 8B by performing first sampling on all the pixels of the entire image illustrated in FIG. 8A.

However, pixels at R1C6 and R4C7, i.e., focus detection pixels A7 and A8 may fail to retain their values during binning with pixels at R3C6 and R6C7, respectively. Thus, the image sensor 306 may output values of the focus detection pixels A7 and A8 intact without binning them with pixels at R3C6 and R6C7, respectively.

Accordingly, as illustrated in FIG. 8B, the first sampling image may include pixel values obtained from binning and values of focus detection pixels A7 and A8 output as they are.

Figure 8C:
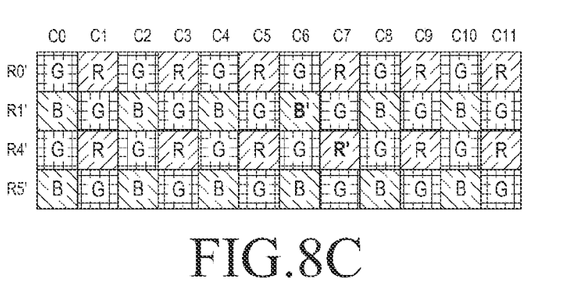

Once the first sampling image is output by the image sensor 304, as illustrated in FIG. 8B, the image processor 306 may detect values of the focus detection pixels A7 and A8 included in the first sampling image and store them in the storage 310 for focus adjustment or directly provide them to a separate focus adjustment module (not illustrated). The image processor 306 may restore image signals at the locations of the focus detection pixels A7 and A8 to be image pixel values R' and B' using the DPC algorithm, and produce a restored image with the image pixel values R' and B', as illustrated in FIG. 8C.

Figure 8D:
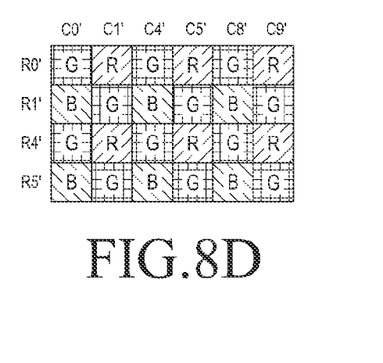

With the restored image with the image pixel values R' and B', the image processor 306 may output a final image as illustrated in FIG. 8D by binning all of the pixels included in the horizontal rows of the restored image to have half the resolution of the restored image.

For example, the image processor 306 may perform binning on values of two pixels at R0'C0' and R0'C2 to output a value for pixel at R0'C0', as illustrated in FIG. 8D. Also, two pixels at R0'C1 and R0'C3 may be binned into a value for pixel at R0'C1', as illustrated in FIG. 8D. Values for pixels at R0'C4', R0'C5', R0'C8' and R0'C9' of FIG. 8D may also be obtained in the same way.

Figure 9A:
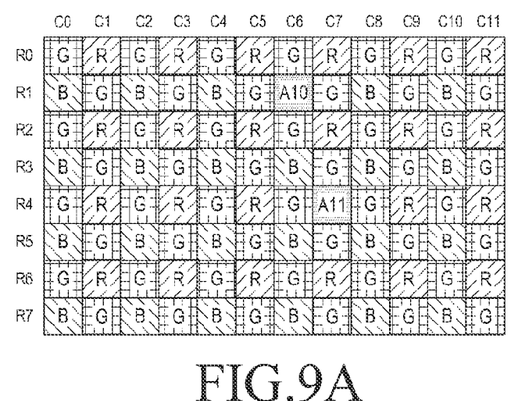
FIGS. 9A to 9D illustrate an image processing operation, according to an embodiment of the present invention.

FIGS. 9A to 9D illustrate an image processing operation, according to an embodiment of the present invention. Specifically, FIG. 9A illustrates pixels of an image sensor, such as the image sensor 304, including image pixels R, G, and B and focus detection pixels A10 and A11.

Figure 9B:
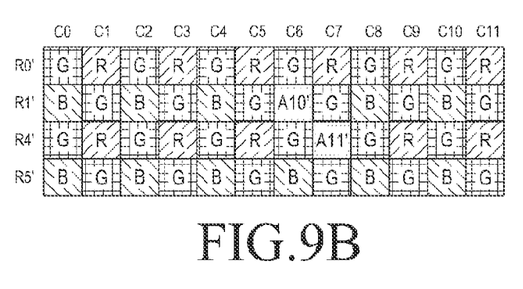

The image sensor 304 may output a first sampling image reduced by half in the vertical direction by performing first sampling on all the pixels of the entire image illustrated in FIG. 9A. For example, the image sensor 304 may output the first sampling image as illustrated in FIG. 9B by performing first sampling in the manner of binning values of pixels in two rows with respect to respective columns into single pixel values for all the pixels of the entire image illustrated in FIG. 9A. Specifically, the image sensor 304 may perform binning on values of pixels at R0C0 and R2C0 to output a value for pixel at R0'C0, and on values of pixels at R1C0 and R3C0 to output a value for pixel at R1'C0, as illustrated in FIG. 9B. As such, the image sensor 304 may output the first sampling image as illustrated in FIG. 9B by performing first sampling on all the pixels of the entire image illustrated in FIG. 9A.

Pixels at R1C6 and R4C7, i.e., focus detection pixels A10 and A11, may also be binned with pixels B and R at R3C6 and R6C7, respectively, into pixels A10'(A10'=(A10+B)/2) and A11'(A11'=(A11+R)/2) at R1'C6 and R4'C7, respectively, in the first sampling image.

Accordingly, as illustrated in FIG. 9B, the first sampling image may include image pixels obtained from binning and pixels A10' and A11' obtained by binning image pixels and focus detection pixels.

Figure 9C:
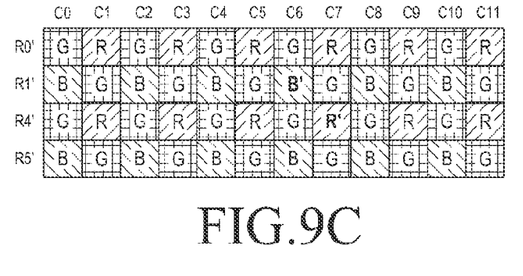

If the first sampling image illustrated in FIG. 9B is output from the image sensor 304, the image processor 306 may restore values of the binned focus detection pixels A10' and A11' to be values of image pixels B' and R' through the DPC algorithm, thus producing a restored image with the image pixels B' and R', as illustrated in FIG. 9C.

Since the restored image pixels B' and R' are similar to the original image pixels B and R, the image processor 306 may estimate values of the focus detection pixels by calculation, such as A10=2*A10'−B' and A11=2*A11'−R' and store the estimated values of the focus detection pixels A10 and A11 in the storage 310 for focus adjustment or provide them to a separate focus adjustment module (not illustrated).

Figure 9D:
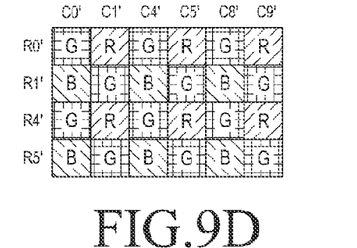

For the image as illustrated in FIG. 9C, the image processor 306 may output a final image having half the resolution of the restored image, as illustrated in FIG. 9D, by binning pixels included in the horizontal rows.

For example, the image processor 306 may perform binning on values of two pixels at R0'C0' and R0'C2 to output a value for pixel at R0'C0', as illustrated in FIG. 9D. Also, two pixels at R0'C1 and R0'C3 may be binned into a value for pixel at R0'C1', as illustrated in FIG. 9D. Values of pixels at R0'C4', R0'C5', R0'C8' and R0'C9' of FIG. 9D may also be obtained in the same way.

FIGS. 10 to 12C respectively illustrate images for quality comparison, which are obtained without applying embodiments of the present invention and in other instances, by applying the embodiments of the present inventions.

Figure 10:
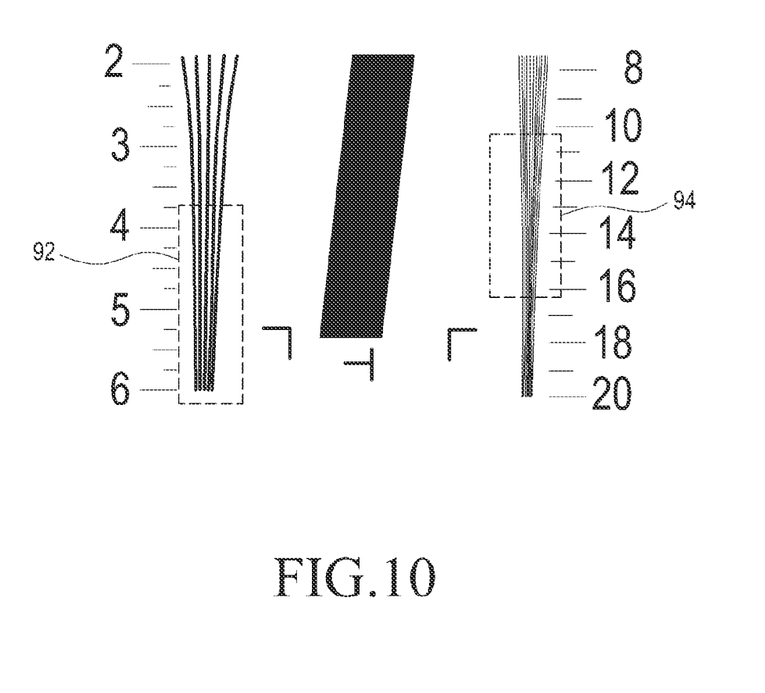
FIG. 10 illustrates an image obtained without applying embodiments of the present invention.

Specifically, FIG. 10 illustrates an image that includes entire pixel values. For reference, the image illustrated in FIG. 10 is a non-corrected Bayer pattern image. Dashed areas 92 and 94 represent high-frequency image areas having significant a difference in values between pixels thereof.

Figure 11A:
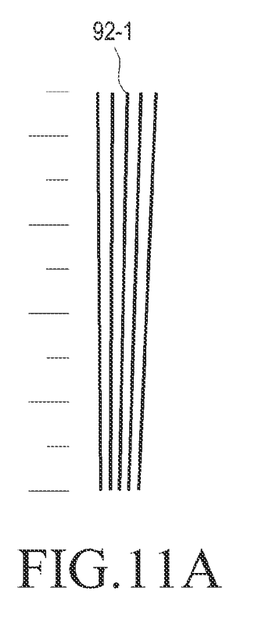
FIGS. 11A to 11C and 12A to 12C illustrate images obtained by applying embodiments of the present invention.
Figure 11B:
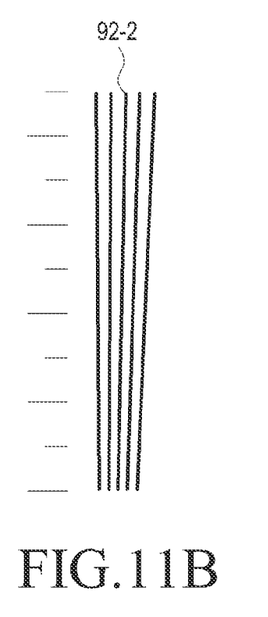
Figure 11C:
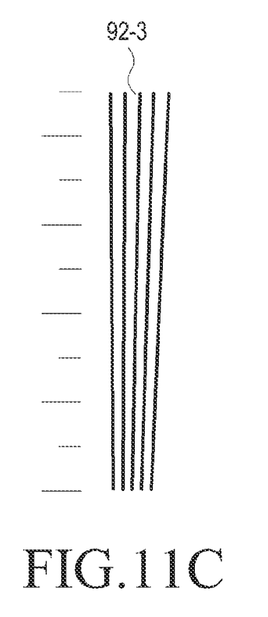

FIGS. 11A to 11C illustrate images resulting from applying one of the aforementioned embodiments of the present invention to a high-frequency image within the area 92.

Specifically, FIG. 11A illustrates an image 92-1 obtained by binning image pixels that do not include focus detection pixels, and FIG. 11B illustrates an image 92-2 obtained from a conventional method by which, if there is a focus detection pixel located in a target pixel position for binning, an image sensor may output signals from image pixels, except the focus detection pixel, by binning the image pixels while outputting a signal from the focus detection pixel as it is read, i.e., intact.

FIG. 11C illustrates an image 92-3 obtained by applying one of the aforementioned embodiments of the present invention.

When comparing FIGS. 11A, 11B, and 11C, the image 92-2 obtained from the conventional method, as illustrated in FIG. 11B, has poor image quality because whether image signals from locations of focus detection pixels of a high-frequency image are reflected as image pixel signals may bring about a significant difference, creating e.g., black spots on the boundary between the black area and the white area. However, the image 92-3 obtained by applying one of the aforementioned embodiments of the present invention, as illustrated in FIG. 11C, has little difference in image quality, when compared to the image 92-1 as illustrated in FIG. 11A, which does not take into account the focus detection pixels, despite the image 92-3 being produced by taking into account the focus detection pixels.

Figure 12A:
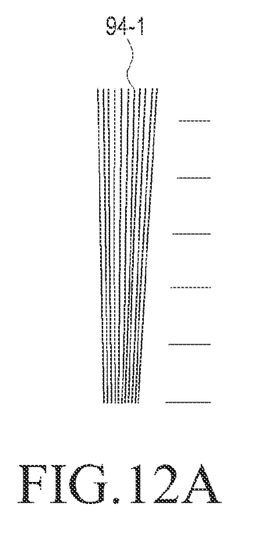
Figure 12B:
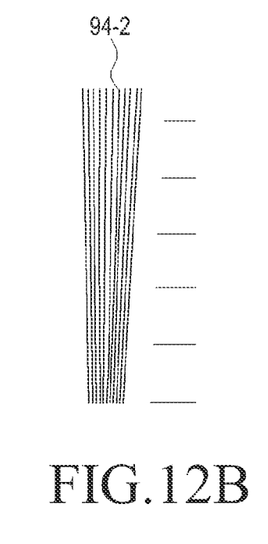
Figure 12C:
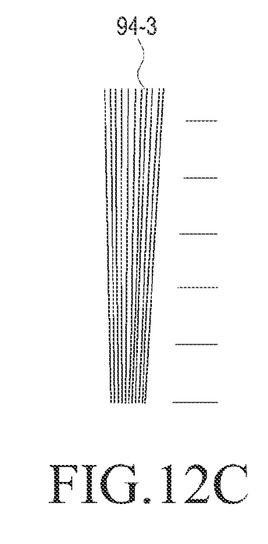

FIGS. 12A to 12C illustrate images resulting from applying one of aforementioned embodiments of the present invention to a high-frequency image within the area 94 illustrated in FIG. 10. Specifically, FIG. 12A illustrates an image 94-1 obtained by binning image pixels that does not include focus detection pixels, and FIG. 12B illustrates an image 94-2 obtained from a conventional method by which, if there is a focus detection pixel located in a target pixel position for binning, an image sensor may output signals from image pixels except the focus detection pixel by binning the image pixels while outputting a signal from the focus detection pixel as it is read, i.e., intact.

FIG. 12C illustrates an image 94-3 obtained by applying one of the aforementioned embodiments of the present invention.

When comparing FIGS. 12A, 12B, and 12C, the image 94-2 obtained from the conventional method, as illustrated in FIG. 12B, has poorer image quality because whether image signals from locations of focus detection pixels of a high-frequency image are reflected as image pixel signals may bring about a significant difference, creating e.g., white spots on the boundary between the black area and the white area. However, the image 94-3 obtained by applying one of the aforementioned embodiments of the present invention, as illustrated in FIG. 12C, has little difference in image quality as compared to the image 94-1 illustrated in FIG. 12A, which does not take into account the focus detection pixels, despite the image 94-3 being produced by taking into account the focus detection pixels.

In accordance with the above-described embodiments of the present invention, focus adjustment is provided with correct values of focus detection pixels, while decreasing image quality loss due to the focus detection pixels, even if some of the pixel values are provided from a digital image sensor having one or more pixels that produce data that is not normally used as image information, such as focus detection pixels.

Methods according to various embodiments of the present invention may be implemented in program instructions which are executable by various computing means and recorded in computer-readable media. The computer-readable media may include program instructions, data files, data structures, etc., separately or in combination. The program instructions recorded on the computer-readable media may be designed and configured specially for the present invention, or may be well-known to people having ordinary skill in the art of computer software.

Although certain embodiments of the present invention have been illustrated and described above, a person having ordinary skill in the art will understand and appreciate that various modifications can be made without departing the scope of the present invention. Thus, it will be apparent to those ordinary skilled in the art that the present invention is not limited to the above-described embodiments described, which have been provided only for illustrative purposes.

What is claimed is:

1. An image processing apparatus comprising:
an image sensor including a plurality of first pixels configured to detect an image and a plurality of second pixels configured to detect a different type of signal than the plurality of first pixels, the image sensor being configured to output a first sampling image by performing a first sampling on all pixels included in the plurality of first pixels and the plurality of second pixels, based on a predetermined rule, wherein the first sampling on the all pixels is performed by binning values of at least two of the plurality of first pixels without binning values of the plurality of second pixels, wherein the first sampling image is outputted by separating first sampling pixels obtained from the first sampling into the binned values of the plurality of first pixels and values other than the binned values in the first sampling pixels; and
an image processor configured to restore values of at least one of the plurality of second pixels to be image pixel values for locations of the at least one of the plurality of second pixels included in the first sampling image, to output a restored image based on the restored values, to perform binning on pixels of the restored image using a predetermined method, and to output a reduced resolution image with a resolution reduced at a predetermined rate from the restored image, based on the binning.

2. The image processing apparatus of claim 1, wherein the image processor performs the binning by converting a plurality of pixel signals into a single pixel signal using a predetermined operation.

3. The image processing apparatus of claim 1, wherein the predetermined rate comprises any one of a half and a third of a resolution of the restored image.

4. The image processing apparatus of claim 1, wherein the image processor restores the values of the at least one of the plurality of second pixels to be the image pixel values by correcting the values of the at least one of the plurality of second pixels using a Defect Pixel Correction (DPC) algorithm.

5. The image processing apparatus of claim 1, wherein the image processor is further configured to restore the values of at least one of the plurality of second pixels to be the image pixel values using a Defect Pixel Correction (DPC) algorithm.

6. The image processing apparatus of claim 5, wherein the image processor is further configured to estimate a value of at least one of a focus detection pixel on the image pixel values which are the restored binned pixel values, by predetermined rule.

7. An image processing method by an image sensor that includes a plurality of first pixels for detecting an image and a plurality of second pixels for detecting a different type of signal than the plurality of first pixels, the image processing method comprising:
outputting a first sampling image by performing a first sampling on all pixels included in the plurality of first pixels and the plurality of second pixels, based on a predetermined rule, wherein the first sampling on the all pixels is performed by binning values of at least two of the plurality of first pixels without binning values of the plurality of second pixels, wherein the first sampling image is outputted by separating first sampling pixels from the first sampling into the binned values of the plurality of first pixels and values other than the binned values in the first sampling pixels;
restoring values of at least one of the plurality of second pixels to be image pixel values for locations of the at least one of the plurality of second pixels included in the first sampling image;
outputting a restored image based on the restored values;
performing binning on pixels of the restored image using a predetermined method; and
outputting a reduced resolution image with a resolution reduced at a predetermined rate from the restored image, based on the binning.

8. The image processing method of claim 7, wherein performing the binning comprises converting a plurality of pixel signals into a single pixel signal using a predetermined operation.

9. The image processing method of claim 7, wherein the predetermined rate comprises any one of a half and a third of a resolution of the restored image.

10. The image processing method of claim 7, wherein restoring the values of the at least one of the plurality of second pixels to be the image pixel values comprises correcting the values of the at least one of the plurality of second pixels using a Defect Pixel Correction (DPC) algorithm.

11. The image processing method of claim 7, wherein restoring the values of the at least one of the plurality of second pixels to be the image pixel values includes restoring the binned pixel value to be an image pixel value using a Defect Pixel Correction (DPC) algorithm.

12. The image processing method of claim 11, further comprising estimating a value of a focus detection pixel on the image pixel value which is the restored binned pixel value, by predetermined rule.

* * * * *